United States Patent [19]
Ng

[11] Patent Number: 6,042,478
[45] Date of Patent: Mar. 28, 2000

[54] HAND HELD VIDEO GAME

[75] Inventor: Victor Ng, Hong Kong, The Hong Kong Special Administrative Region of the People's Republic of China

[73] Assignee: Tiger Electronics, Ltd., Pawtucket, R.I.

[21] Appl. No.: 08/797,906

[22] Filed: Feb. 10, 1997

[51] Int. Cl.[7] .............................. G06F 15/44; A63F 9/22
[52] U.S. Cl. ........................................ 463/44; 273/148 B
[58] Field of Search ............................... 463/1–9, 30–31, 463/36, 44–45; 273/148 B; 3647/410.1

[56] References Cited

U.S. PATENT DOCUMENTS

| | | | |
|---|---|---|---|
| 4,249,735 | 2/1981 | Bromley | 463/4 |
| 4,386,773 | 6/1983 | Bronstein | 463/44 |
| 4,432,067 | 2/1984 | Nielsen | 364/900 |
| 4,596,390 | 6/1986 | Studley | 463/44 |
| 4,922,420 | 5/1990 | Nakagawa et al. | 273/148 B |
| 5,048,831 | 9/1991 | Sides . | |
| 5,161,803 | 11/1992 | Ohara | 463/44 |
| 5,184,830 | 2/1993 | Okada et al. | 463/31 |
| 5,643,088 | 7/1997 | Vaughn et al. . | |

OTHER PUBLICATIONS

"Single–chip 8–bit Microcomputer SM8521 User's Manual", Creative Core Components, Preliminary Edition Ref. SBX029301E, issued on Mar. 12, 1996 (complete manual).

"The Newton Generation", MacUser, Oct. 1993, pp. 102–107.

*Primary Examiner*—Jessica J. Harrison
*Assistant Examiner*—Mark A. Sager
*Attorney, Agent, or Firm*—Fitch, Even, Tabin & Flannery

[57] ABSTRACT

A hand-held video game system having a microprocessor controller with address and data buses for providing memory accesses during memory cycles to a plurality of cartridge slots for electrically connecting cartridges containing memory to the address and data buses. An output terminal of the microprocessor controller provides cartridge-select signal which identifies a first memory containing cartridge to be accessed during an initial memory cycle with the microprocessor controller controlling the output terminal to change the cartridge-select signal for transparently accessing a second memory containing cartridge for a subsequent memory cycle. The cartridge slot may also provide a port for transferring and receiving information over a bi-directional communication link in which a communication cartridge allows communication over the internet, and allows for interactive play of a video game.

16 Claims, 12 Drawing Sheets

HAND HELD VIDEO GAME

BACKGROUND OF THE INVENTION

The present invention relates to hand held electronic game units and particularly to such game units which include removable program cartridges.

Hand held electronic games are known which include a display screen, control switches and buttons and a microprocessor controller to control the various functions of the game when powered by a storage battery. The microprocessor controller may include a memory for storing a program to control the basic function of the microprocessor such as memory reading and writing and proper control of the display device which is frequently a Liquid Crystal display (LCD) panel. Known hand held video game units include an electrical connector by means of which memory containing program cartridges can be connected to the microprocessor. Replaceable cartridges -which generally store one application program in read only memory are thus used to add a new program, perhaps a video game, to the system.

When a cartridge is installed, its memory provides an additional program and data which becomes the application program of the device. Once a cartridge is installed, the program defined by the cartridge memory can be played repeatedly to the exclusion of other programs. When another program is to be run on the game unit, the prior cartridge is replaced with a new cartridge and a new program can be run until replaced. Although, such a system provides an almost unlimited number of programs which can be run one at a time, it does not allow multiple programs to be available in the unit at the same time. For example, it may be desirable to play a video game interactively over the internet. To do so requires a video game program and an internet access program. Such cannot be done on today's hand held video game units which provide only a single cartridge slot and thus the ability to run only one application program at a time. A need exists for a cartridge-based hand held electronic game unit which contemporaneously accommodates multiple cartridges for application programs.

Another problem which exists with known cartridge-based hand held game units is that the amount of memory available, even when the cartridge is present, is too limited due to the limited address spectrum of the control microprocessor. For example, when a game controller can access only 2 megabytes of memory the application program is limited to 2 megabytes minus the memory address spectrum portion needed for other parts of the hand held game operation. In order to increase the available memory, systems, such as that disclosed in U.S. Pat. No. 4,432,067 to Nielsen, have been proposed in which a cartridge of the system includes a plurality of groups of memory locations which in total comprise more memory than is available in the memory spectrum of the controller. Particular memory addresses are then used to select one or the other of the groups of memory locations in the single cartridge so that the particular group for access can be identified.

The Neilsen system has been found to provide some advantages but also to possess problems. For example, at least one extra access memory cycle is needed when memory group selection changes must be made. When frequent memory group changes are required, much memory access overhead may be incurred with the extra memory access cycles needed to switch between groups of locations. This slows down system operation. Also, the additional memory can be used only with the application program of the single cartridge and separate such systems require their own memory group switching capability. Even with expanded memory addressing capability, when the RAM provided in a cartridge fills with data no additional RAM can be provided. These shortcomings identify a problem and a need exists for an arrangement which is capable of providing additional memory for use by cartridge-contained application programs of a hand held video game.

It is also desirable for the hand held game to be able to identify the source of cartridges inserted into the system. Some cartridges, perhaps knock-off copies of proprietary cartridges, can then be denied access to hand held game units. Also, knowledge of the source of the game cartridge may permit the game controller to account for known incompatibilities. Thus, a further problem exists in marking, identifying and validating cartridges for hand held game units which is both accurate and secure.

SUMMARY OF THE INVENTION

The problems of the art are solved in accordance with the present invention in which a hand held video game unit is provided having the capability of operating with a plurality of application program cartridges having, in total, a greater amount of memory than the address spectrum of the controller of the video game unit. Switching between cartridges is performed by controlling signal levels on normally non-address bearing conductors. Further, the address spectrum occupied by the plurality of cartridges is also shared with memory internal to the game unit and storing programs and data to which access is needed regardless of the presence or absence of application program cartridges. An efficient and universal arrangement is employed to separate memory accesses to the internal and cartridge memories in a manner transparent to which of the plurality of cartridges may be in active control of the game unit. Also provided is a method and apparatus for identifying the insertion and removal of cartridges and determining the validity of inserted cartridges.

The cartridges of the disclosed embodiment are inserted into cartridge slots of the game unit. Advantageously, each cartridge slot includes a connection to one of a plurality of I/O pins of a microcontroller and by applying a cartridge select signal to a selected I/O pin, the memory of a single cartridge can be enabled to respond to both memory reads and writes. Simply changing the particular I/O pin receiving the cartridge select signal selects the cartridge memory which will be permitted to respond to subsequent memory access operations.

Also an advantage is the use of memory in the lowest part of the address spectrum for internal game unit memory, the switchable cartridge memory can occupy the highest portion of the address spectrum. Within the game unit, the high order address bits are used to enable and disable the internal memory while, conversely, disabling and enabling the high order cartridge memory. In this way, regardless of which cartridge is in active control of the unit memory address are properly responded to by the internal and external memory.

The presence or absence of a cartridge in the provided cartridge slots is determined by reading the state of mechanical switches which change state depending on the presence or absence of a cartridge. When a newly inserted cartridge is discovered, predetermined memory locations in the cartridge memory are read and checked for validity. Additionally, the contents of at least one of the memory locations so read is decoded to identify a plurality of additional cartridge memory locations which may be distributed anywhere in the cartridge memory spectrum. The identified memory locations are then read and their contents combined to form a value known to the game unit controller. When and only when favorable comparison is obtained the cartridge is identified as present and usable and an icon representing the cartridge is displayed on a LCD display of the game unit. The particular cartridge in active control of the game unit can be specified by an operator who touches a touch sensitive screen overlaying the LCD display.

DETAILED DESCRIPTION OF PREFERRED EMBODIMENT

Figure 1:
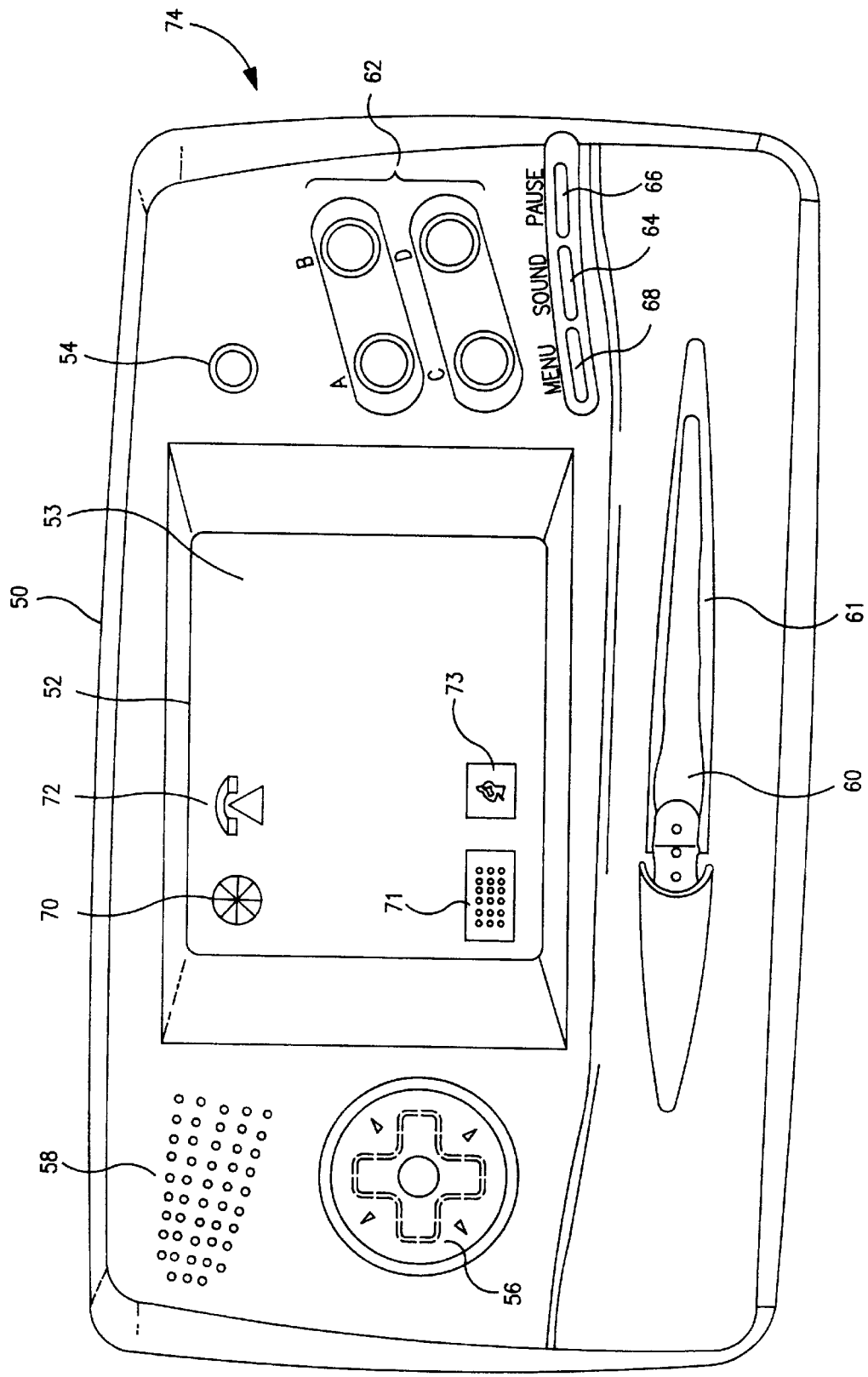
FIG. 1 is a top view of a hand held game unit embodying the present invention.

FIG. 1 is a plan view of a hand held video game unit 50 in accordance with the preferred embodiment. Game unit 50 comprises an on-off button 54, a group of play buttons 62 labeled A–D, and a multiposition switch 56 (joystick) for user control of application programs run on the game unit. An LCD display screen 52 is provided capable of presenting 160×200 pixels of 4 gray level information to the user. Overlaid on the display screen is a transparent touch screen input device 53 having 10×13 individual touch sensitive switches. In combination, the underlying LCD display 52 and transparent touch sensitive screen provide a software changeable input device for the user. In order to provide precise contact with the touch screen 53, a stylus 60 is provided in a permanent holder 61. To increase enjoyment of use, a sound speaker 58 is also provided.

Figure 2:
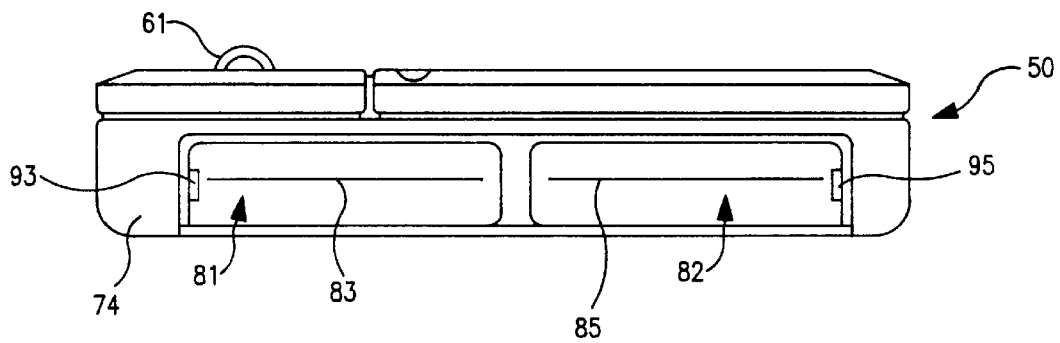
FIG. 2 is an end view of the game unit without program cartridges.
Figure 3:
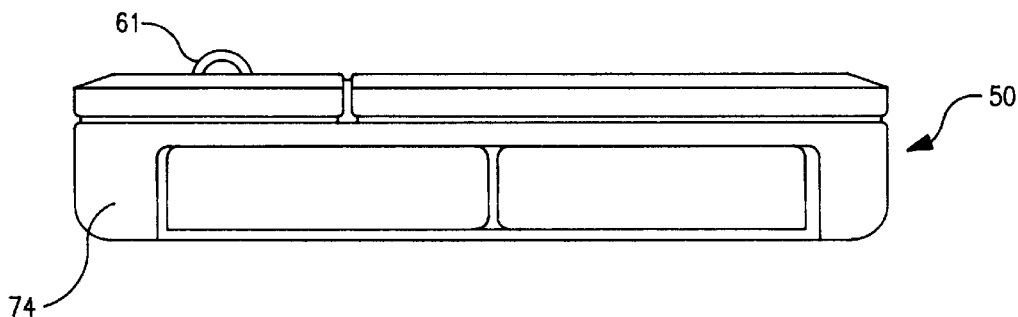
FIG. 3 is an end view of the game unit with program cartridges.
Figure 4:
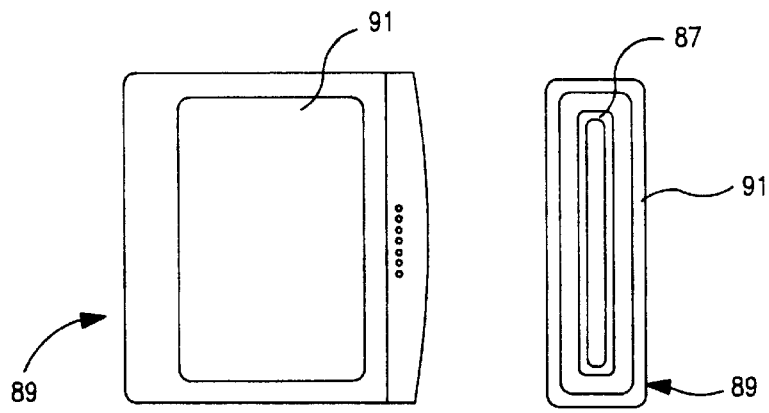
FIG. 4 includes a top, side and end views of a program cartridge.
Figure 4:
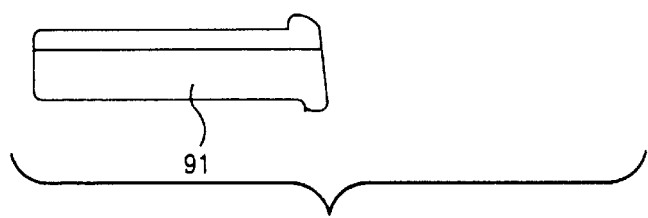

FIG. 2 is a plan view of an end 74 of the game unit 50 and includes two cartridge receptacles (slots) 81 and 82. Cartridge slots 81 and 82 are provided to receive memory containing cartridges as shown in top, end and side view in FIG. 4. Each receptacle contains a two sided electrical connecting strip 85 for electrically mating with a two sided electrical connector 87 carried by each memory cartridge 91 (FIG. 4). In all, the connecting strip, e.g. 85, and mating connector 87, provide 40 electrical connections between the game unit 50 and each cartridge 91. The cartridges 91 are sized to fit within the receptacles 81 and 82 for a non-obtrusive fit as shown in FIG. 3. Game unit 50 also includes a small electrical switch 93 and 95 in each receptacle 81 and 82, respectively. The positions of switches 93 and 95 are moved when a cartridge is inserted or removed from the slot and are used to indicate the presence or absence of a memory cartridge to the game unit 50.

Figure 5:
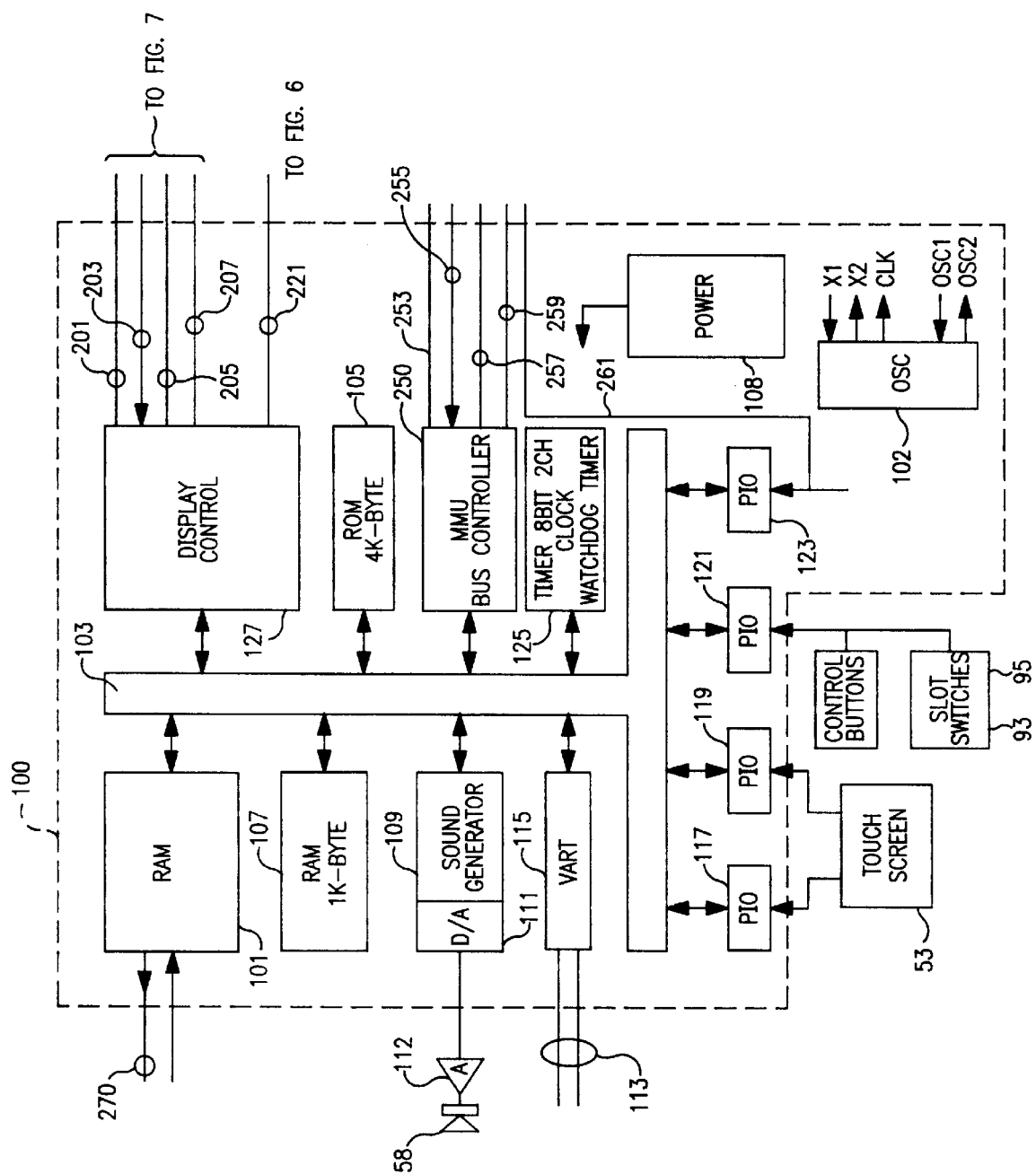
FIG. 5 is a block diagram of a controller for the hand held game unit.

Game unit 50 is controlled by a microprocessor controller 100 (FIG. 5) which in the preferred embodiment is a SM8521 by Sharp. Controller 100 includes a CPU 101 which controls the overall functions of the system and is connected to other units of the controller by a bus 103. A ROM 105 is used to provide the CPU 101 with system control information including instructions for operation. Data used by CPU 101 is primarily exchanged with a RAM 107. CPU 101 provides system sound via a digital sound generator 109 which drives speaker 58 via a D/A converter 111 and an amplifier 112. Controller 100 has an external bi-directional communication link 113 which is provided by a UART 115. The communication link 113 is connected by a suitable connector to the exterior of game unit 50 to provide telephone/modem communication. CPU 101 is also connected to a plurality of 8 bit input output (I/O) registers 117, 119, 121 and 123. The registers can be set by the programmer to be either input or output devices each having 8 individual leads. I/O registers 117 and 119 are connected to the touch screen 53 to provide appropriate inputs to the controller in response to touch of the video screen. I/O register 121 is connected to the control buttons 56, 62, 64, 66 and 68 on the unit 50 and to switches 93 and 95 which, it will be remembered, identify the presence or absence of a cartridge in the cartridge slots 81 and 82. Timer function, as needed, may be performed by an 8 bit timer 125.

Figure 6:
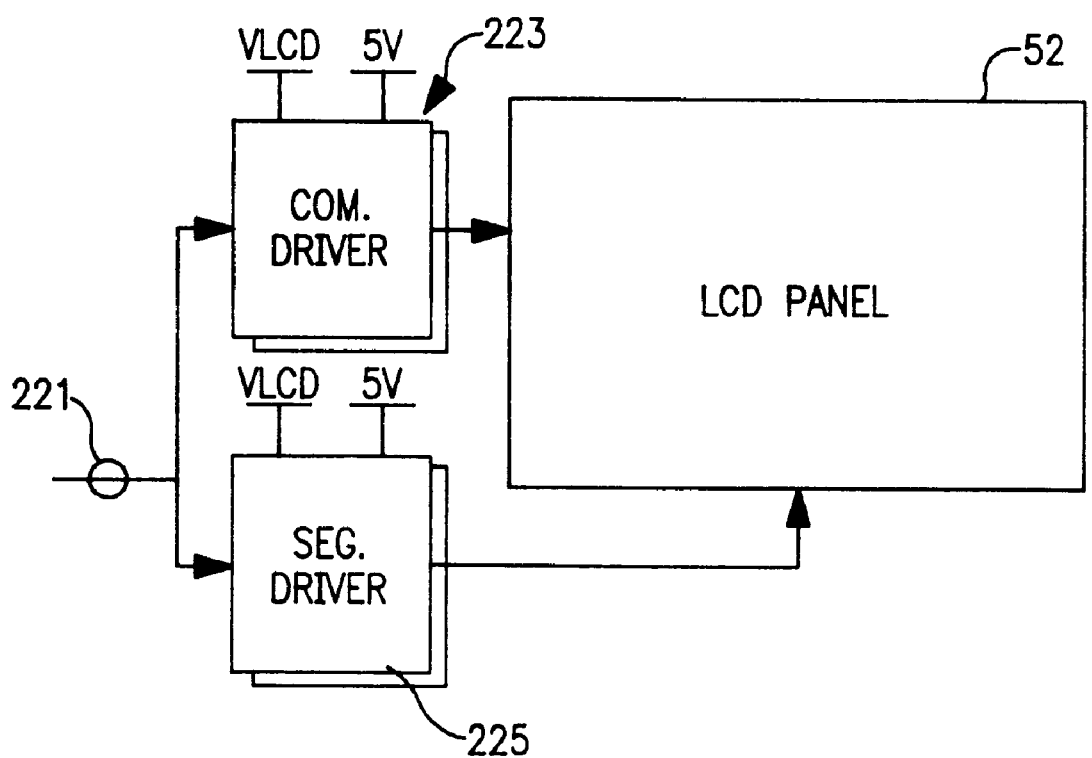
FIG. 6 is a block diagram of an LCD panel and video driver.
Figure 7:
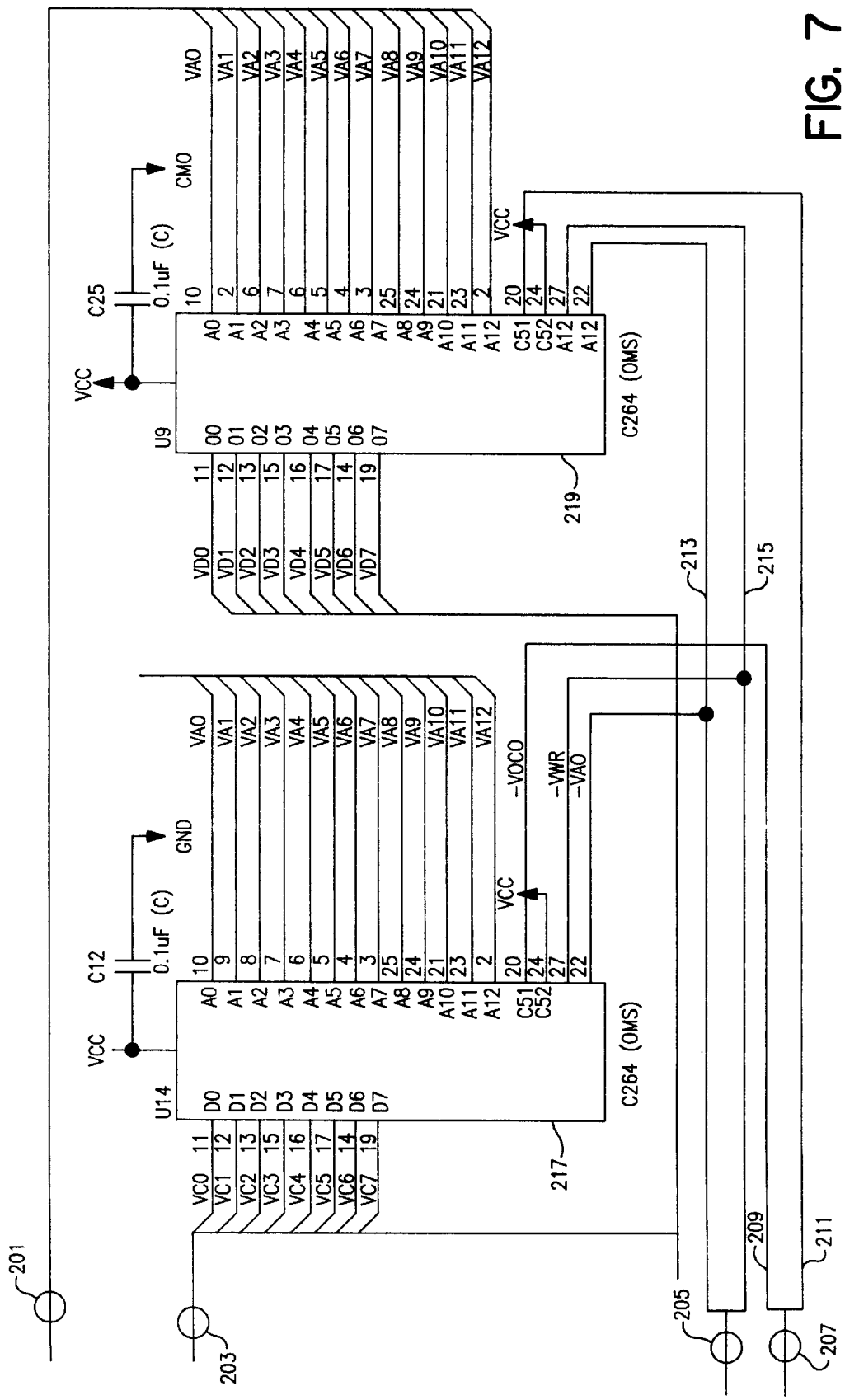
FIG. 7 is a schematic diagram of video RAM.
Figure 8A:
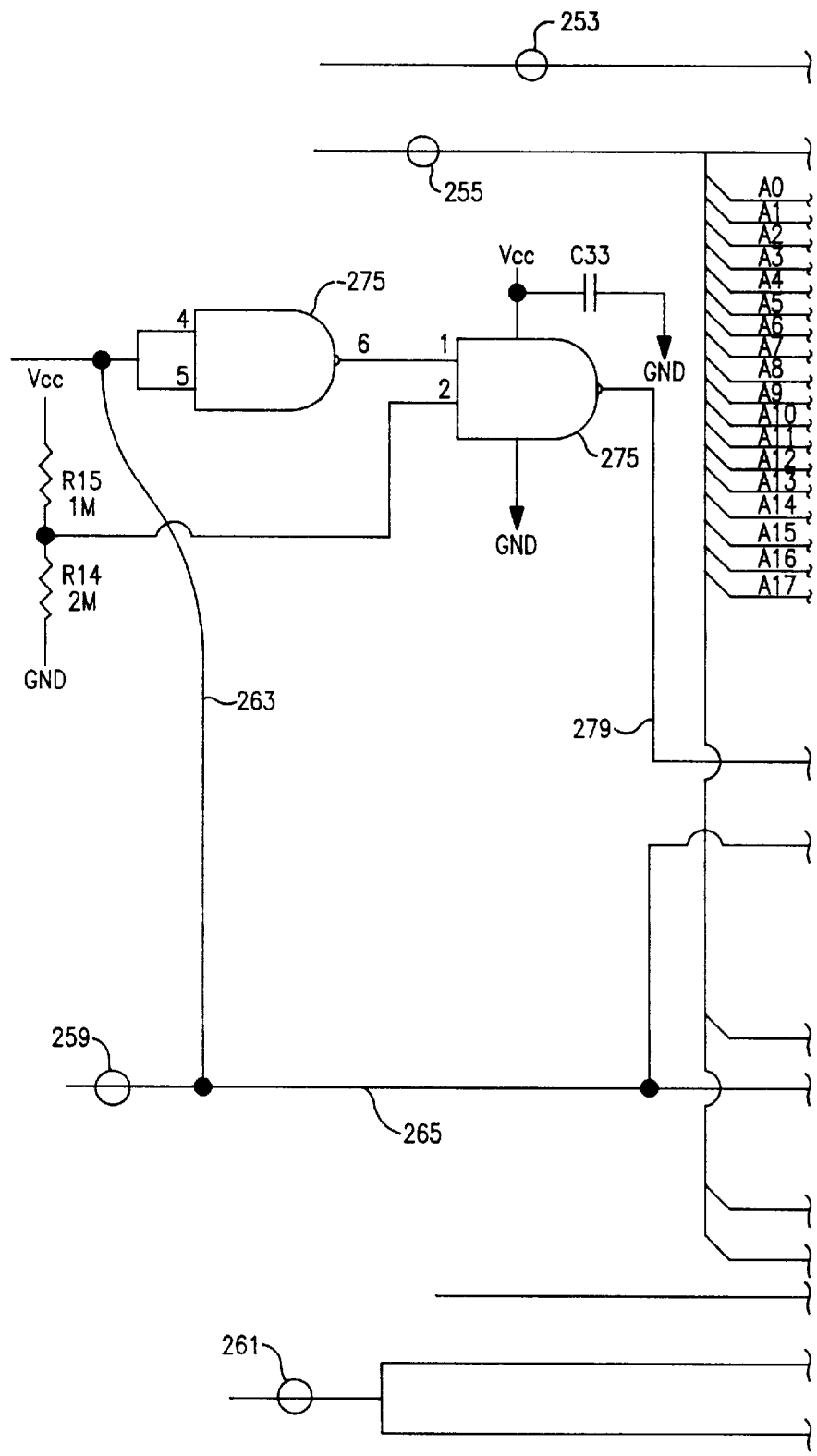
FIG. 8 is a schematic diagram of the extended memory of the controller.
Figure 8B:
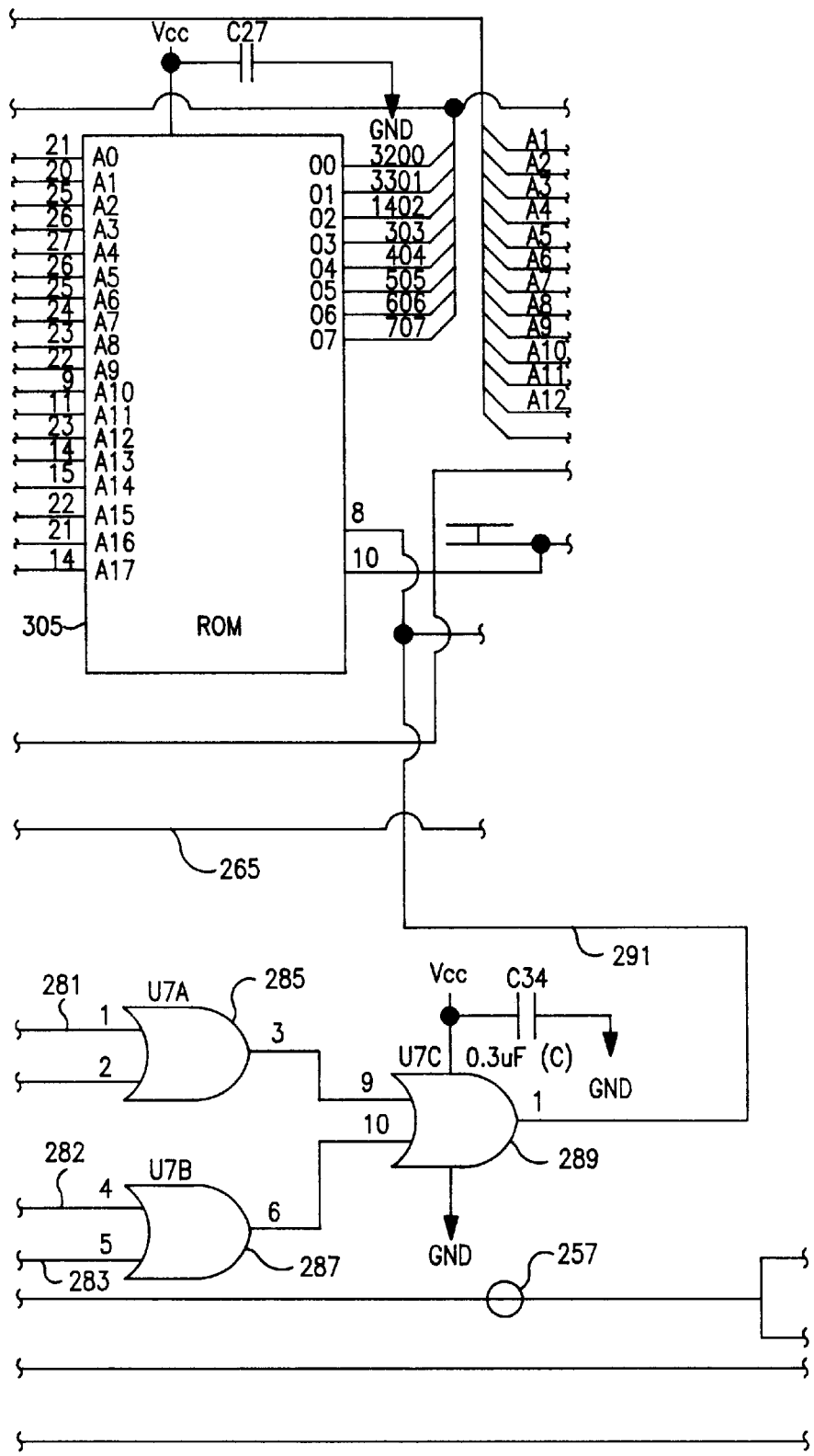
Figure 8C:
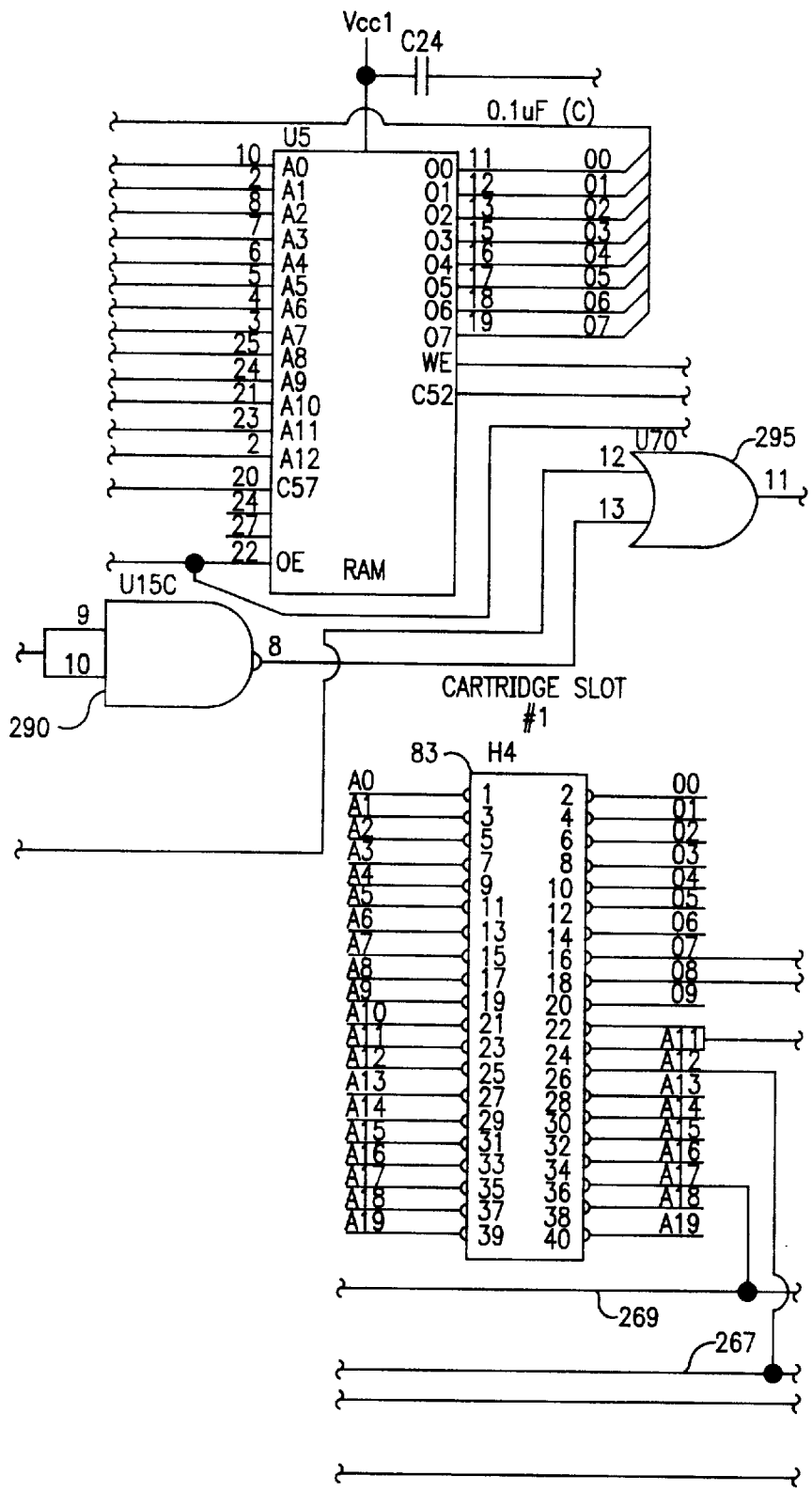
Figure 8D:
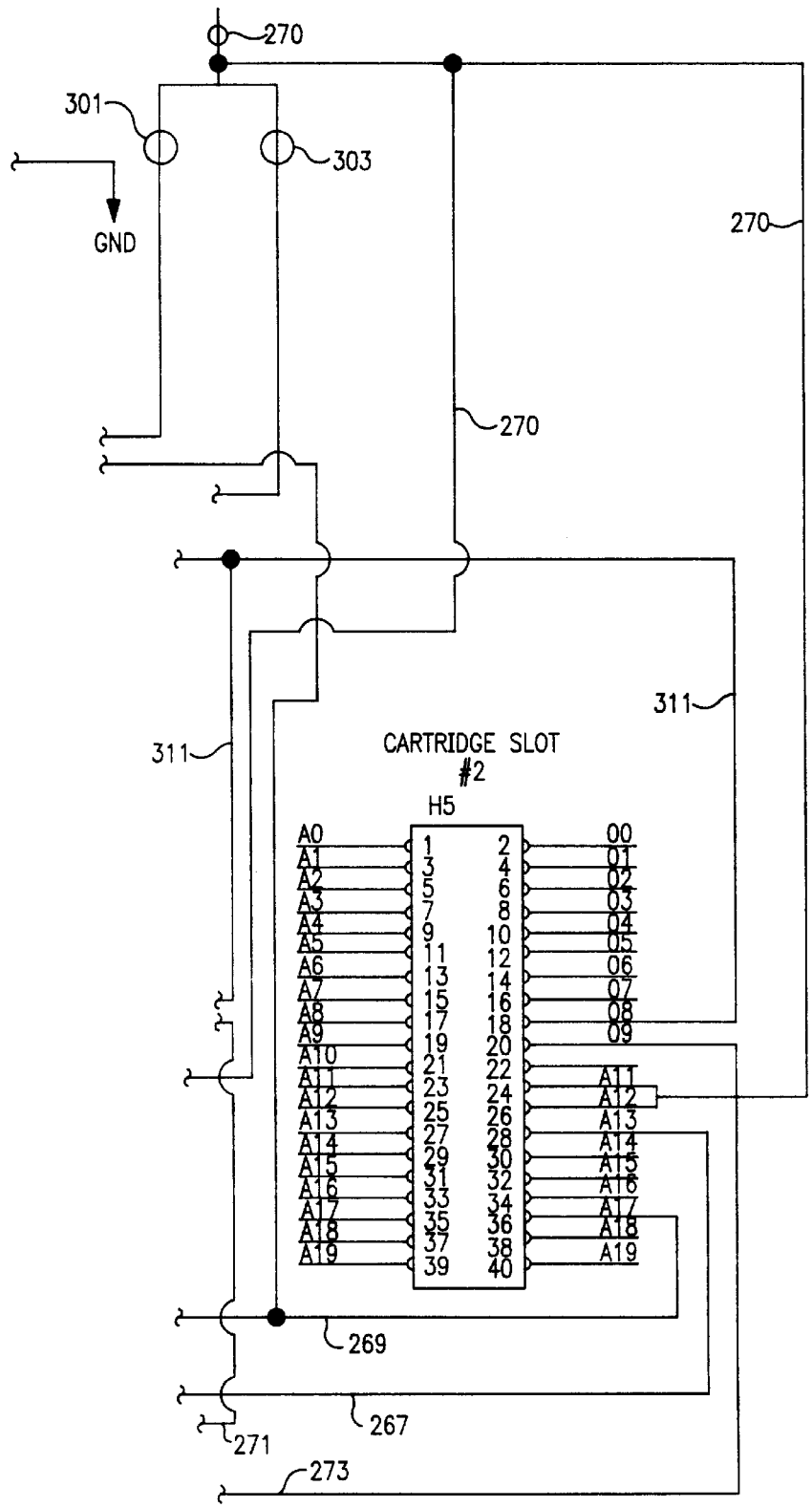

Controller 100 also includes a display controller 127 which includes DMA capabilities and interacts with the display system of FIG. 6 and the video RAM of FIG. 7 to provide images on the LCD display. Video RAM comprises two 8 kilobyte memories 217 and 219. Bus 201 connects output addresses from display controller 127 to the memories 217 and 219 in parallel. Similarly, 8 bit data is conveyed bi-directionally via bus 203. Memory control buses 205 and 207 convey memory control information from display control 127 to the memories 217 and 219. When either memory 217 or 219 is to be read, a read strobe signal is conveyed on a conductor 213 of bus 205 and when either is to be written, a write strobe signal is conveyed via conductor 215 of bus 205. The particular memory, i.e. 217 or 219, which is to react to a provided address, is determined by an enable transmitted signal on either conductor 209 or conductor 211 of bus 207.

The data used from the video RAM of FIG. 7 is transmitted to the display system of FIG. 6 via bus 221 where it is connected to a common driver 223 and segment driver 225. Common driver 223, which may be an LH1527 by Sharp, and segment driver 225, which may be an LH1528 by Sharp, respond to the received data by controlling the gray levels of the 160×200 pixels making up the LCD panel display 52.

Figure 9:
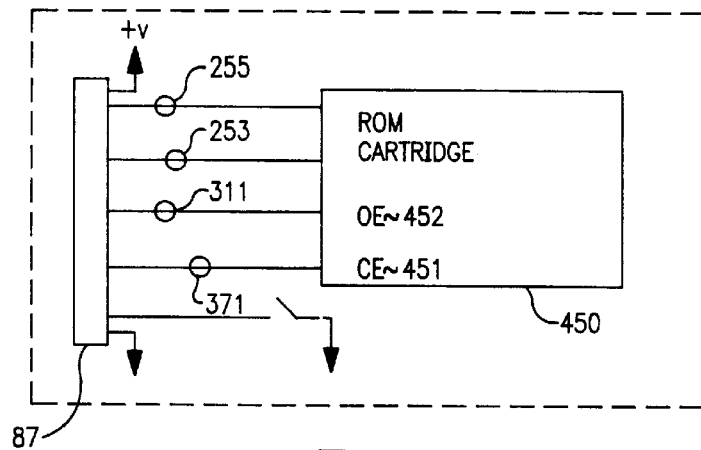
FIG. 9 is a block diagram of a ROM containing program cartridge.
Figure 10:
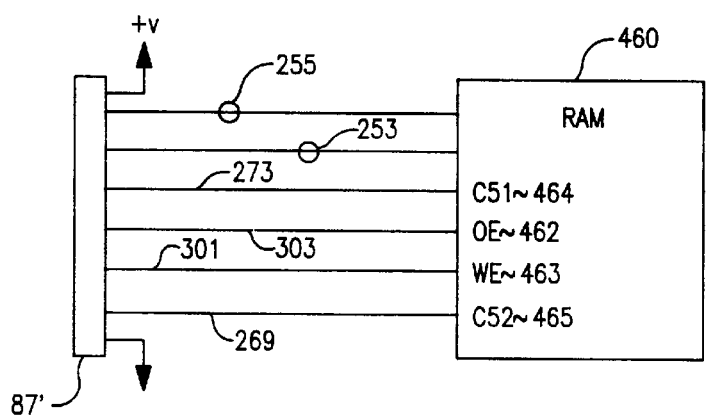
FIG. 10 is a block diagram of a RAM containing program cartridges.
Figure 11:
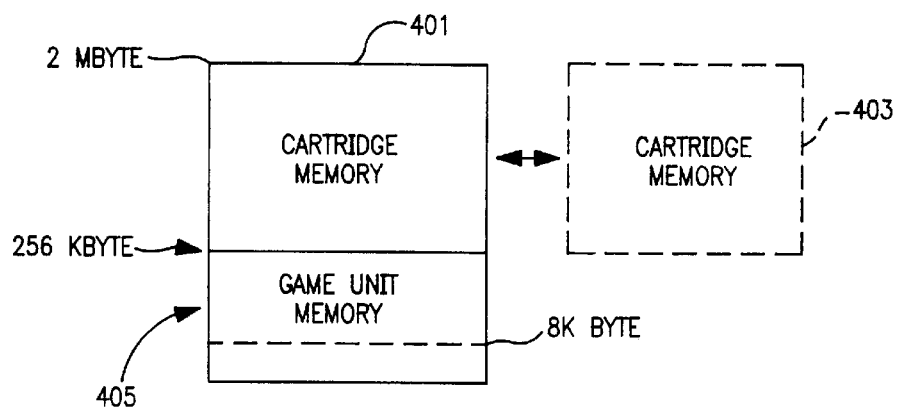
FIG. 11 represents the memory spectrum of extended memory.

The data stored in the video RAM is provided to display control 127 unit over bus 103 and can come from any device with access to that bus. A primary source of such data is external memory which includes memory in cartridges installed in the game unit 50. Such data is accessed via memory management unit 250 in cooperation with read and write strobe signals from CPU 101 on bus 270 and cartridge select signals from I/O port 123 on bus 261. The extended memory is shown in FIG. 8 to include a 256 kilobyte ROM 305 and an 8 kilobyte RAM 307 which is augmented by the memory of cartridges placed in cartridge slots 83 and 85, examples of which are shown in FIGS. 9 and 10. The 2 megabyte extended memory spectrum is represented in FIG. 11. Memories 305 and 307 are internal to the game unit and share the lowest 256 kilobytes (405) of address spectrum. The inserted cartridges share the highest 1.75 megabytes of the address spectrum as represented by cartridge memories 401 and 403 in FIG. 11.

When an external memory access is to occur, an address is sent in parallel on bus 253 and control signals are sent from MMU 250, the CPU 101 and I/O port 123 to assure that the proper memory, which may be cartridge memory, is accessed. The lowest order 13 bits of all addresses are applied to 8 kilobyte RAM 307, the lowest order 18 bits of address are applied to 256 kilobyte ROM 305 and all 21 address bits A0-A020 are sent to the cartridges via connectors 83 and 85. Internal to game unit 50, the three highest order address bits A18, A19, and A20 of the provided address are used by OR gates 285, 287 and 289, NAND gate 290 and OR gate 295 to guarantee that any access to the high order 1.75 megabytes of storage is responded to only by the memory of the cartridges. Similarly, the address bits A18, A19 and A20 assure that only the ROM 305 or RAM 307 respond when the address is in the lowest 256 kilobyte of memory range.

OR gates 285 and 287 receive as inputs the addresses A18 A19 and A20 on conductors 281, 282 and 283. The outputs of OR gates 285 and 287 are combined in OR gate 289 which generates a memory control output on a conductor 291. Whenever any of the three highest order address bits is a logical 1, which occurs only when the upper 1.75 megabytes of memory is being accessed, a logical 1 memory inhibit signal is applied via conductor 291 to inhibit response by ROM 305. The signal on conductor 291 is also inverted by NAND gate 290 and connected by an OR gate 295 to a cartridge output enable terminal of the cartridge connectors 83 and 85 via a conductor 311. Thus, when any of the top three address bits are set, ROM 305 is inhibited from responding while the cartridge memories are enabled. Conversely, when none of the highest three address bits are set, the cartridge memories are inhibited from responding while the ROM 305 is enabled to respond. The read or write response by the memories is controlled by the read or write strobe signals from CPU 101 on bus 270, which signals are individually connected to the cartridge slots 83 and 85 and memories 305 and 307 by conductors 301 and 303.

The contents of ROM 305 include a program by which the game unit 50 is interfaced with the information received from the cartridges in slots 83 and/or 85. The interface program is referred to herein as the kernel. Whenever a cartridge is inserted into the game unit, the CPU 101, operating in response to instructions from the kernel, identifies and validates the cartridge and also tracks which cartridge is considered to be active. When only a single cartridge is present, that cartridge will be marked active in a predetermined location of RAM 307. When two cartridges are present only one will be marked active at a time in the RAM 307, however, the active and inactive status of the cartridges can be changed whenever needed by the game unit 50. The cartridge slot which contains the active cartridge receives from I/O port 123 an exclusive cartridge select signal on conductor 271 (cartridge slot 83) or conductor 273 (cartridge slot 85). Thus, whenever the cartridge in slot 83 is active, it will receive the cartridge active signal on conductor 271 while no cartridge active signal will be sent to cartridge slot 85. Conversely, when the cartridge in slot 85 is active it will receive the cartridge active signal on conductor 273 while cartridge slot 83 will not be sent a cartridge active signal.

FIG. 9 represents a ROM containing cartridge having memory fabric 450 connected by a connector 87 to a cartridge slot connector, e.g. 83. The memory addresses are connected to ROM 450 via bus 253 and data from the ROM 450 is connected to data bus 255. Proper read timing is assured by the connection of the output enable terminal 452 of ROM 450 to the read strobe from CPU 101 on conductor 311. ROM 450 also receives the cartridge select signal on conductor 271 at its chip enable input. Thus, when no cartridge select signal is present from the I/O port 123 on conductor 271, ROM 450 cannot respond to memory accesses. FIG. 10 represents a RAM containing cartridge connected to the cartridge slot connector 85. Address and data are supplied to RAM fabric 460 by address and data buses 253 and 255, respectively. The read and write strobes from CPU 101 are also connected to the output enable 462 and write enable 463 pins RAM fabric 460 by respective conductors 303 and 301. The cartridge select signal on conductor 373 is applied to a first chip select 464 while an IO enable on conductor 269 is connected to chip select input 465.

RAM 307 shares memory spectrum with the ROM 305 and, accordingly, apparatus is provided to select RAM 307 to the exclusion of ROM 305. When RAM 305 is to be accessed, a memory chip enable signal is applied by MMU 250 to a conductor 263 of a bus 259 and no such signal is sent on a memory chip enable conductor 265 of that bus. By properly alternating the enable signals on conductors 263 and 265, RAM 307 and the remainder of the extended memory can be alternatingly accessed. The memory chip enable signal is applied to ROM 305 and the cartridge connectors 83 and 85 by its connection as an input to OR gate 285. The memory chip enable signal on conductor 263 is connected to RAM 307 by a pair of NAND gates 275 and 277 connected in series and a connection from the output of NAND gate 277 to the chip select input of RAM 307.

Figure 12:
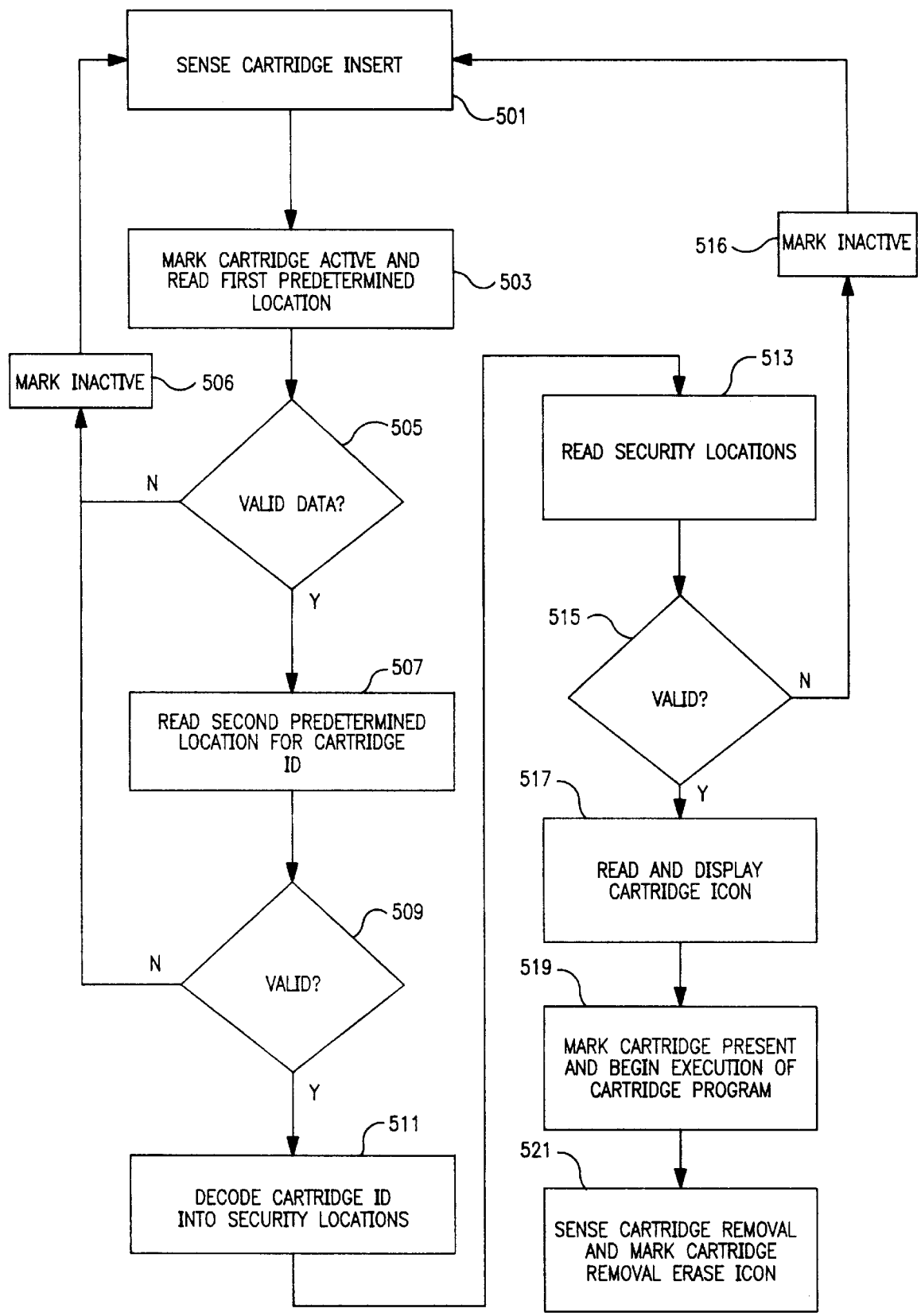
FIG. 12 is a flow diagram of cartridge recognition and validation.

When game unit 50 is initially turned on, power is supplied to the various components from a power supply 108 which may be a combined battery and/or adapter power supply. In response to power up, the controller 100 performs an initialization routine in which the status of the unit is checked. After initialization is completed, the kernel is accessed to establish the necessary interface to possible cartridge provided programs and to present to the user any application programs which are a part of the kernel. In the present example the kernel includes a calendar application program and a solitaire application program. To announce the availability of these applications, the kernel writes into video RAM 217, 219 an icon 72 representing a calendar page and an icon 73 representing a playing card. By normal operation the icons 72 and 73 are displayed on LCD display 52 as shown in FIG. 1. The CPU under the control of the kernel periodically reads the state of the touch sensitive screen 53 by accessing I/O ports 117 and 119. Should either of the icons 71 or 73 be touched by the user, the program flow will begin the performance of the touched application program. The user can change the active application simply by touching the other icon. At some time the user may insert a cartridge into either of the cartridge slots 81 or 82 of the game unit. The controller 100 periodically scans the status of cartridge switches 93 and 95 and when a change of state is detected indicating the insert of a cartridge, a cartridge authentication procedure begins at block 501 as shown in FIG. 12. After a cartridge is detected in block 501, a block 503 is performed in which the cartridge is marked active and the contents of a first predetermined location is read from the cartridge. As described above, marking the cartridge active results in a cartridge select signal being generated on the cartridge select conductor of bus 261 corresponding to the newly active cartridge enabling its memory fabric to respond to such a read request. The contents read from the first predetermined location may comprise an ASCII string of characters which are compared in a block 505 to a known string of characters stored in a kernel data file. If the read string of characters does not match the kernel's string, access is denied causing the flow to proceed to block 506 to mark the cartridge inactive and thereafter to revert to block 501 to await a change of state at a cartridge slot.

When the read string of characters matches the kernel's string flow proceeds from block 505 to block 507 where a cartridge ID is read from a second predetermined location. The second predetermined location may comprise 4 bytes of data with the fourth being a check sum for the first three. The accuracy of the first three bytes are then compared with known ID types to determine whether the ID type is valid in a block 509. If the ID type is not valid or if the check sum is improper, the flow reverts to block 501. If the cartridge ID is found to be valid in block 509 it is decoded in block 511 to identify three byte locations within the cartridge memory which in combination contain a security code. The type of decoding, although not critical to the present invention, must be known prior to the preparation of the kernel and must be adhered to in the preparation of all cartridges. One type of decoding might involve using every third bit of the three byte cartridge ID to identify an 8 bit address for use in accessing a memory location table. The table would then provide three memory addresses to read from the cartridge.

After block 511 flow proceeds to block 513 in which the three locations are read and compared to expected results in a block 515. When block 513 finds the result to be invalid, the cartridge is marked inactive in block 516 and flow returns to block 501. Alternatively, when the security bytes are determined to be valid, flow proceeds to block 517 where the icon for the cartridge is read from the cartridge and written into video RAM 217, 219 and displayed. FIG. 1 represents such a display at 70 for a game of chance cartridge program. After displaying the icon 70, flow proceeds to block 519 in which the cartridge is marked valid and present and in which execution of the application program begins. By means of the I/O ports the controller 100 continues to read the status of the switches 93 and 95 and when a formerly present cartridge is removed, the process variables for the application and any indication of its presence are removed so that the game unit will not attempt to access an unavailable program.

After the successful validation of a first cartridge a second cartridge may be inserted into the second cartridge slot. When such occurs, the cartridge will be validated as described above and a second cartridge icon, e.g. 72, will be presented on the display of the game unit 50. When two icons, e.g. 70 and 72, are presented the user can switch the active application program back and forth by touching the icons on display 52. Changing the active program causes the controller 100 to issue an I/O command to remove a cartridge select signal from one cartridge slot and apply the cartridge select signal to the other cartridge slot. The user can also revert to performance of one or the other of the kernel provided applications by touching an icon 71 or 72.

Figure 13:
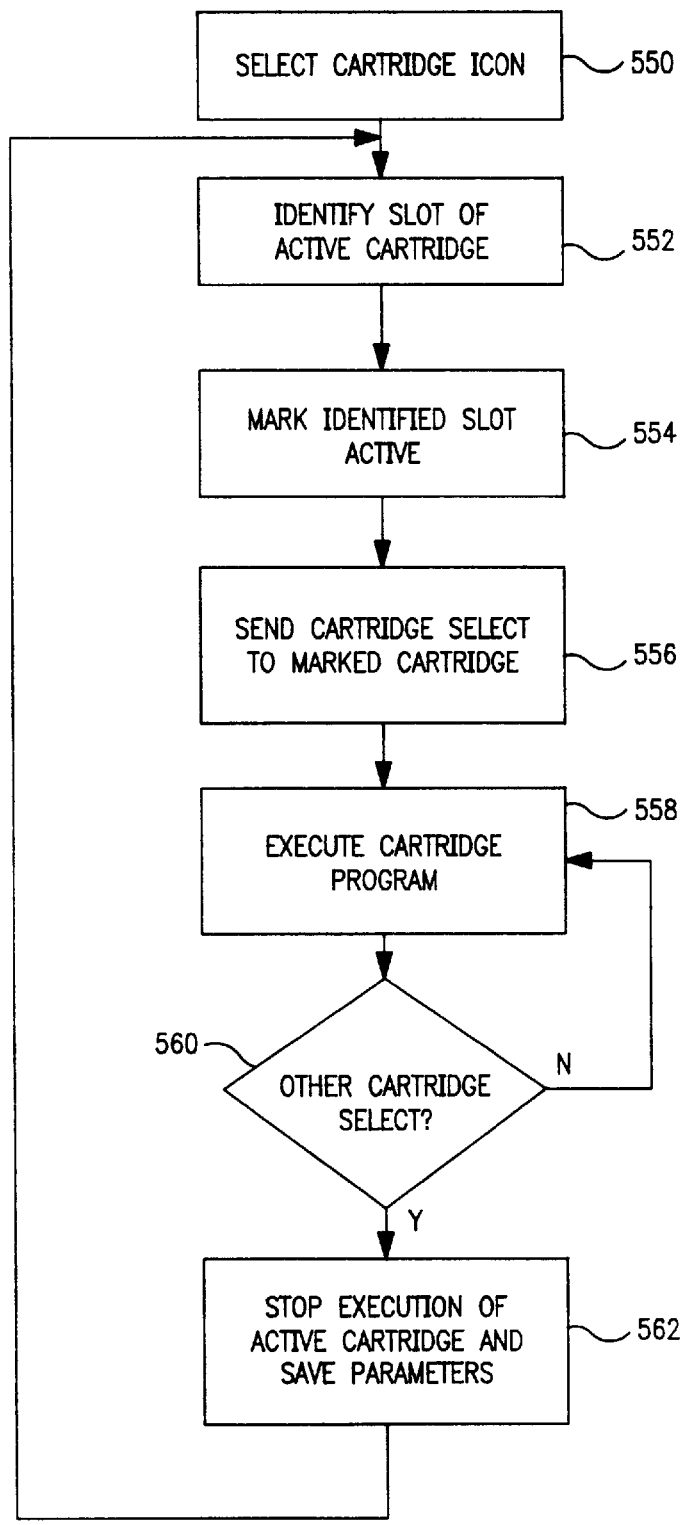
FIG. 13 is a flow diagram of the switch between active cartridges.

The change of accessing from one cartridge is transparent to the user and may occur in response to program events not known to the user, such as a command from the program of a first cartridge to access the memory of the second cartridge. FIG. 13 is a flow diagram of cartridge select changing in response to icon selection by a user. For purposes of the example, the cartridge associated with icon 70 is in cartridge slot 81 connected by connector 83 and cartridge associated with icon 72 is in catridge slot 82 connected by connector 85. Further, neither cartridge is active and thus no cartridge select signal is being sent to either cartridge connector 83 or 85.

Block 550 of FIG. 13 represents a user touching an icon 70 on the touch screen. The touch is detected via I/O ports 117, 119 and a block 552 is performed to identify the cartridge connector 83 connected to the touched cartridge. After such identifying, the cartridge and slot are marked active in block 554 and flow proceeds to block 556. The active cartridge, and thus the memory storing the application to be executed, is connected to cartridge connector 83 and must be enabled to respond to memory accesses from controller 100. Accordingly, CPU 101 commands I/O 123 to connect the cartridge connect signal to cartridge connector 83 via conductor 271.

After the cartridge connect signal is applied, all subsequent high order memory accesses will be responded to by the memory of the newly active cartridge and the program contained thereby will begin execution (block 558).

The CPU continues to survey the touch screen 53 via I/O ports 117, 119, and when icon 72 is touched it will be detected in a block 560 and flow proceeds to a block 562 in which execution of program 70 is stopped and the parameters of its execution are saved for possible later use. Flow then proceeds to block 552 and continues as before so that cartridge slot 85 is marked active and the cartridge select signal is applied via I/O port 123 and conductor 273 to the memory connected to cartridge slot 85. After the cartridge selection signal is applied to cartridge connector 85, high order memory accesses will be responded to by the cartridge connected via connector 85.

The cartridge connectors 83 and 85 connect the cartridge select signals, read and write strobes and output enables to memory within the cartridge. Other signals are present at the connector to further broaden cartridge use. For example, an interrupt lead 601, 602 to the CPU 101 from a cartridge mounted switch such as switch 451 may be used to signal cartridge related data to the CPU. Further, a pair of input/output enable leads are present at each cartridge connector on conductors 269 and 267. Signals on conductors 269 and 267 may be further used to control memory responses from within each cartridge.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A hand held video game system comprising:
   a microprocessor controller having address and data buses for providing memory accesses during each of a plurality of memory cycles;
   a plurality of cartridge slots for electrically connecting cartridges containing memory to the address and data buses;
   a plurality of memory containing cartridges each electrically connected to the address and data buses;
   at least one output terminal of the microprocessor controller providing a cartridge-select signal, said signal identifying a first memory containing cartridge to be accessed during the memory cycle; and said microprocessor controller controlling the output terminal to change the cartridge-select signal for transparently accessing a second memory containing cartridge in a subsequent memory cycle.

2. A hand held video game system in accordance with claim 1 wherein at least one output terminal is an I/O terminal of the microprocessor.

3. A hand held video game system in accordance with claim 1 wherein microprocessor accessible memory of the game unit comprises a plurality of low order addressable memory locations separate from the memory contained by the cartridges and connected to the address and data buses and the system comprises circuitry responsive to high order bit positions of a memory address for inhibiting response by the low order addressable memory of the game unit.

4. A hand held video game system in accordance with claim 3 comprising circuitry for enabling response by the memory of the cartridges when response is inhibited to the low order addressable memory.

5. The hand held video game of claim 1, where an instruction in the first memory containing cartridge commands the microprocessor controller to change the cartridge-select signal for subsequent memory cycles.

6. The hand held video game of claim 1 where a user commands the microprocessor controller to change the cartridge-select signal for subsequent memory cycles.

7. The hand held video game of claim 1 where a program instruction commands the microprocessor controller to change the cartridge-select signal for subsequent memory cycles.

8. The hand held video game system of claim 1, said system further having a port for transferring and receiving information over a bi-directional communication link whereby a remote user is able to play a video game on said system.

9. The hand held video game system of claim 8, where the bi-directional communication link is over the internet.

10. The hand held video game system of claim 8, where the remote user is able to interactively play a video game on said system.

11. A hand held video game unit comprising:
a controller having a plurality of controller memory locations for the storage of programs and data;
a video display unit responsive to the operation of the controller for displaying images on the video display unit;
a first cartridge connection circuit for electrically connecting a cartridge containing computer memory to the controller;
a second cartridge connection circuit for electrically connecting a second cartridge containing computer memory to the controller;
apparatus for sensing the connection of a cartridge to the first and second cartridge connectors;
the controller responds to the sensed presence of a cartridge by controlling the video display unit to display an indication of the connected cartridge; and
said controller transparently changes from one cartridge to another cartridge accessed in a subsequent memory cycle.

12. A hand held video game unit in accordance with claim 11 wherein the connected cartridge includes memory location storing an icon representative of the connected cartridge; and
the controller reads the icon from the connected cartridge and causes the video display unit to display the read icon.

13. A hand held game unit in accordance with claim 11 comprising:
a first cartridge containing a first video icon defined in memory connected to the first connection circuit;
a second cartridge containing a second video icon defined in memory connected to the second connection circuit; and
apparatus for reading the first and second icons from the memories of the first and second cartridges and displaying both the first and second icons on the video display unit.

14. In a hand held game unit a method of marking a memory containing cartridge connected to the unit for subsequent access in response to a user selection or a program instruction, comprising the steps of:
first reading data from a first predetermined memory location of the cartridge;
first determining the validity of the data in the first predetermined memory location;
second reading cartridge identity data from a second predetermined memory location of the cartridge;
decoding the cartridge identity data to determine a plurality of memory location addresses;
reading security data from the memory locations determined in the decoding step;
second determining the validity of the security data; and
marking a valid cartridge for subsequent access including via transparent switching.

15. In a hand held unit a method in accordance with claim 14 wherein the game unit comprises a display apparatus method comprising reading from the cartridge memory data representing a cartridge icon and displaying the icon on the display apparatus.

16. In a hand held game unit a method of identifying a memory containing cartridge in accordance with claim 14 comprising determining the validity of the cartridge identity data before the decoding step.

* * * * *